Aug. 17, 1926.                                                1,596,216
                  N. PANGBURN
                 VEHICLE SIGNAL
         Filed June 10, 1924        2 Sheets—Sheet 1
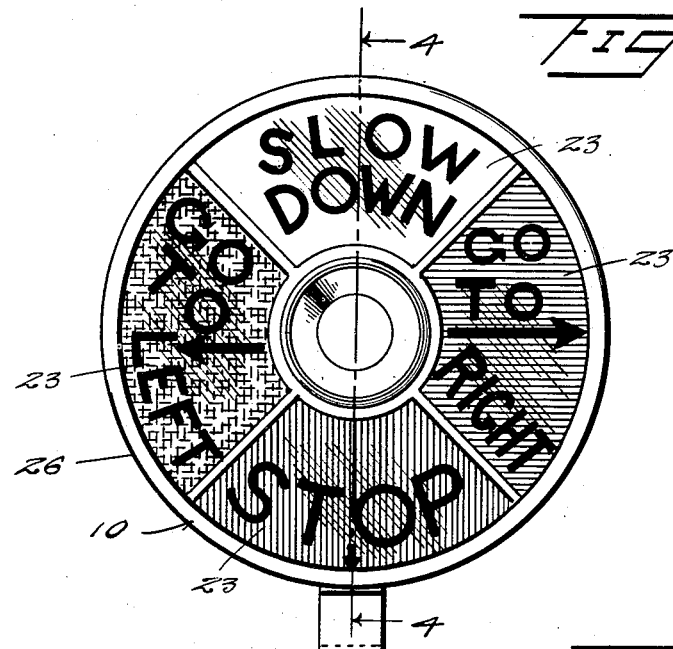
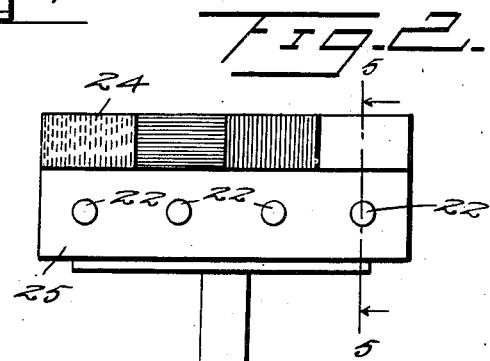
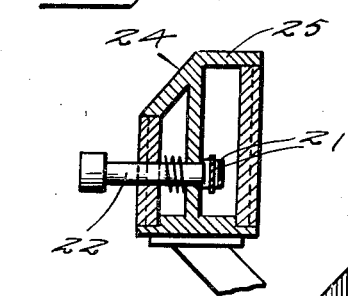
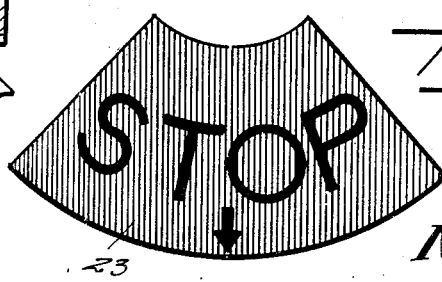
Inventor
N. Pangburn
By
Attorney Aug. 17, 1926.
N. PANGBURN
1,596,216
VEHICLE SIGNAL
Filed June 10, 1924    2 Sheets-Sheet 2
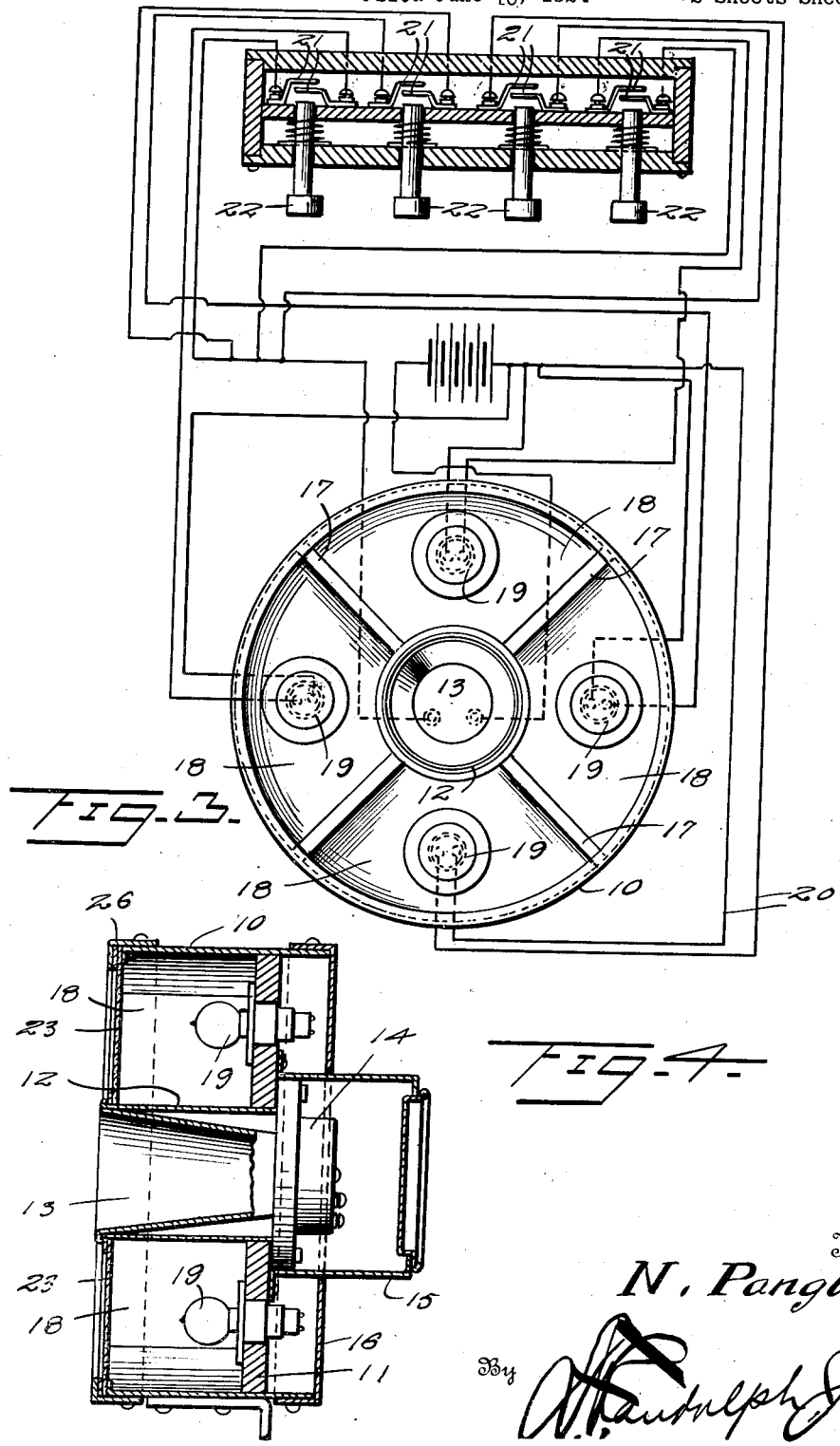

Patented Aug. 17, 1926.

1,596,216

UNITED STATES PATENT OFFICE.

NORRIS PANGBURN, OF CASTLETON, NEW YORK.

VEHICLE SIGNAL.

Application filed June 10, 1924. Serial No. 719,157.

The present invention relates to traffic controlling signalling means to be applied to a motor vehicle whereby to sound an audible signal simultaneously with displaying a visual signal to the end that the driver of a vehicle in the rear as well as pedestrians may have their attention called to the nature of the signal displayed, thereby avoiding a casualty.

The invention provides a signal adapted to be located at the rear of a vehicle and electrically controlled by a plurality of switches readily accessible to the driver so that the switch for displaying the proper signal may be easily selected and operated, thereby sounding both an alarm and displaying a visual signal indicating the intention of the driver, whether to slow down, stop or go to the right or to the left.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a vehicle signal embodying the invention;

Figure 2 is a front view of the multiple switch for controlling the signal;

Figure 3 is a diagrammatic view showing the circuit;

Figure 4 is a sectional view on the line 4—4 of Figure 1;

Figure 5 is a sectional view of the switch, on the line 5—5 of Figure 2; and

Figure 6 is a detail view of one of the plates bearing the directional matter.

Corresponding and like parts are referred to in the following description and designated in the several views of the drawings by like reference characters.

The signal embodies a case 10 which as shown is preferably of circular form. A partition 11 divides the case 10 into front and rear compartments. A circular opening is formed in the center of the partition 11 and receives a cylindrical shell 12 through which passes a horn 13 to the inner or small end of which is fitted a sounding unit 14 which is electrically operated in any preferred way. A housing 15 encloses the unit 14 and is attached to the partition 11. A cap 16 closes the rear end of the case 10.

The front compartment of the case is subdivided by radial partitions 17 into chambers 18 and each of these chambers contains an electric light 19 which is mounted upon the partition 11. Each of the lamps 19 is included in a circuit 20 which is controlled by means of a switch 21 which may be actuated by means of a push button 22. Each of the switches 21 also controls the circuit including the audible signals 13—14. It will thus be understood that when any one of the switches is operated to display a visual signal, the audible signal is at the same time operated to attract attention to the visual signal to the end that a casualty may be avoided. The front of each of the chambers 18 is closed by a translucent plate 23 which bears the required directional data which has the words "Slow down", "Stop", "Go to right", and "Go to left". The plate 23 may be differently colored and the colors match or agree with corresponding colors indicated at 24 in Figure 2, upon a portion of the front of a case 25 enclosing the audible switch mechanism. The colors are of different shades or tints such as white, red, yellow and blue, and corresponding colors are provided upon the plate 23 and front of the switch case 25. A retaining ring 26 fitted to the front of the case 10 holds the plate 23 in place and admits of said plate being easily and readily removed when it is required to gain access to any of the chambers 18, for any purpose.

What is claimed is:—

A vehicle signal comprising a casing, a partition in said casing intermediate its front and rear walls and having an opening therein, a shell mounted in said opening and extending through the front wall of the casing, an electric horn including a sound directing tube and a flanged portion, means securing the latter to the partition with the sound directing portion extending through the shell, a housing secured to the rear side of the partition and partially enclosing the electric horn, said housing extending through an opening in the rear wall of the casing, and visual signals carried by the partition between the shell and the side walls of the casing.

In testimony whereof I affix my signature.

NORRIS PANGBURN.